United States Patent [19]

Hurley et al.

[11] Patent Number: 4,763,638
[45] Date of Patent: Aug. 16, 1988

[54] GAS SELF-CLEAN DOUBLE WALL OVEN

[75] Inventors: James E. Hurley, Allentown; Robert H. Stettler, Reading, both of Pa.

[73] Assignee: Raytheon Company, Lexington, Mass.

[21] Appl. No.: 49,492

[22] Filed: May 14, 1987

[51] Int. Cl.4 .............................................. A21B 1/00
[52] U.S. Cl. ................................ 126/31 A; 126/21 R; 126/273 R; 219/10.55 R; 219/10.55 B; 219/400
[58] Field of Search ............... 126/21 R, 21 A, 273 R, 126/273 A

[56] References Cited

U.S. PATENT DOCUMENTS

| | | | |
|---|---|---|---|
| 3,333,531 | 8/1967 | Reuther | 126/273 R X |
| 3,889,099 | 6/1975 | Nuss | 126/21 A X |
| 3,924,601 | 12/1975 | Nuss | 126/273 A X |
| 4,354,084 | 10/1982 | Husslein et al. | 126/21 A X |
| 4,375,213 | 3/1983 | Kemp et al. | 126/273 X |
| 4,598,689 | 7/1986 | Eke | 126/21 R X |

Primary Examiner—Larry Jones
Attorney, Agent, or Firm—William R. Clark; Richard M. Sharkansky

[57] ABSTRACT

A pyrolytic self-clean gas double wall oven having over and under ovens, and an exhaust manifold on top which receives combustion products from both ovens and vents them through a single front port. The flue pipe from the bottom oven runs up along the back of the upper oven and enters the manifold above the flue pipe for the upper oven. The entrance of the upper oven to the manifold is larger than the lower oven entrance and larger than the flue pipe exit from the upper oven so as to avoid putting a back pressure on the upper oven. Both ovens are encased by an air chamber through which air is forced to cool the outside surfaces of the double wall oven.

12 Claims, 4 Drawing Sheets

GAS SELF-CLEAN DOUBLE WALL OVEN

BACKGROUND OF THE INVENTION

The present invention relates to gas fueled ovens and particularly to a built-in double wall oven having pyrolytic self-cleaning capability.

The outer surfaces of built-in wall ovens contact or are in close proximity with adjacent and supporting structures which often are fabricated of wood. Accordingly, the temperature of the outer surfaces of a built-in wall oven must be maintained below a level that would cause damage to the household or even start a fire. With conventional built-in wall ovens that do not have the self-clean feature, sufficient insulation has been an acceptable solution to limiting external surface temperatures because the oven compartment typically does not exceed 500°-550° F. However, with a self-clean oven, the oven compartment is heated in the range from 900°-1100° F. for several hours during a pyrolytic cycle. The use of insulation alone is not generally practical for a built-in wall oven under these extreme conditions of temperature and time. Because of the very high temperatures, a significant amount of heat passes through any practical type and thickness of insulation, and, with the confinement of a built-in wall oven, extremely hot and perhaps damaging external surface temperatures could be reached.

Such as described in U.S. Pat. No. 4,375,213, attempts have been made to overcome the above-described problem by encasing a built-in wall oven with a spaced jacket or outer casing that defines an air chamber surrounding the oven compartment. A fan was used to force air through the chamber so as to remove substantial amounts of heat which pass through the insulation layer. In this way, the temperature of the jacket or casing is controlled to an acceptable level.

Because built-in wall ovens are generally encased on all sides except for the front, the above-described cooling air must be drawn in and expelled from the front surface. With an electric oven, this generally is no problem because there is sufficient surface area on the front to accommodate apertures for drawing in and expelling the cooling air. However, with a gas oven, there are other requirements for the limited surface area on the front. More specifically, with a gas oven, both primary and secondary combustion air and the combustion products must pass through vents on the front, and as recognized in U.S. Pat. No. 4,375,213, the cooling air should be isolated from the combustion air so as to provide proper burning characteristics. Because it is desirable to limit the front surface area of a built-in wall oven, there are tight constraints for the entrance and exhaust of cooling and combustion air from a gas wall oven. This problem is made more severe with a double wall oven because combustion products are exhausted from two oven cavities.

SUMMARY OF THE INVENTION

It is an object of the invention to provide improved ventilation of combustion products from a gas double wall oven.

It is also an object to provide a gas self-clean double wall oven that, from the front surface, draws in and expels air for cooling the outer surfaces, draws in combustion air that is isolated from the cooling air, and expels combustion products from both ovens.

It is a further object to combine the combustion products from two wall ovens into a manifold so that they can be exhausted through a single port, while not creating a back pressure on either oven. These and other objects of the invention are provided by a gas self-clean double wall oven comprising a first oven compartment comprising a top, bottom, side and back walls, and a door, a first burner for providing combustion products to the first oven compartment, a second oven compartment positioned below the first oven compartment and comprising a top, bottom, side and back walls, and a door, a second burner for providing combustion products to the second oven compartment, a first flue pipe for exhausting the combustion products from the first oven, a second flue pipe for exhausting the combustion products from the second oven compartment, and a combustion product manifold positioned above the first oven compartment for receiving the combustion products from the first and second flue pipes and for directing the received combustion products out of the top front of the double wall oven. It may be preferable that the second flue pipe extend up along the back wall of the first oven compartment and communicate with the manifold above the position where the first flue pipe communicates with the manifold. Also, the entrance of the first flue pipe into the manifold may have a substantially larger cross-sectional area than the entrance of the second flue pipe. Further, it may be preferable that at least a portion of the first flue pipe have a cross-sectional area substantially smaller than the cross-sectional area of the entrance of the first flue pipe into the manifold. Also, the manifold may have an inclined bottom, a substantially horizontal top, and sides that expand laterally from back to front. This arrangement minimizes the height of the double wall oven while still providing favorable exhaust of combustion products. The double wall oven may also comprise a cooling air chamber surrounding both the first and second oven compartments, and means for moving air through the cooling air chamber. Further, fans may be provided to force the air through the region above the first oven compartment.

The invention may also be practiced by a gas self-clean double wall oven comprising a first oven compartment comprising a top, bottom, side and back walls, and a door, means for providing combustion products for heating the first oven to a self-clean temperature, a second oven compartment positioned below the first oven compartment and comprising a top, bottom, side and back walls, and a door, means for providing combustion products for heating the second oven compartment to a self-cleaning temperature, a combustion product manifold positioned above the first oven, the manifold having an exhaust port venting outside the front of the double wall oven, and a first entrance port positioned below a second entrance port, a first flue pipe coupled between the first oven compartment and the first entrance port of the manifold for exhausting the combustion products from the first oven compartment, a second flue pipe coupled between the second oven compartment and the second entrance port of the manifold for exhausting the combustion products from the second oven compartment, the second flue pipe extending up along the back wall of the first oven compartment, a cooling air chamber surrounding the first and second oven compartments, and means comprising at least one fan positioned above the first oven compartment for forcing air forwardly and outside the double wall oven and for drawing air through the cooling air chamber. It may be preferable that the first entrance port be substantially larger than the second entrance port, such as, for example, twice as large. Also, it may be preferable that at least a portion of the first flue pipe have a cross-sectional area substantially smaller than the cross-sectional area of the first entrance port into the manifold.

BRIEF DESCRIPTION OF THE DRAWINGS

The foregoing objects and advantages will be more fully understood by reading the Description of the Preferred Embodiment with reference to the drawings wherein.

DESCRIPTION OF THE PREFERRED EMBODIMENT

Figure 1:
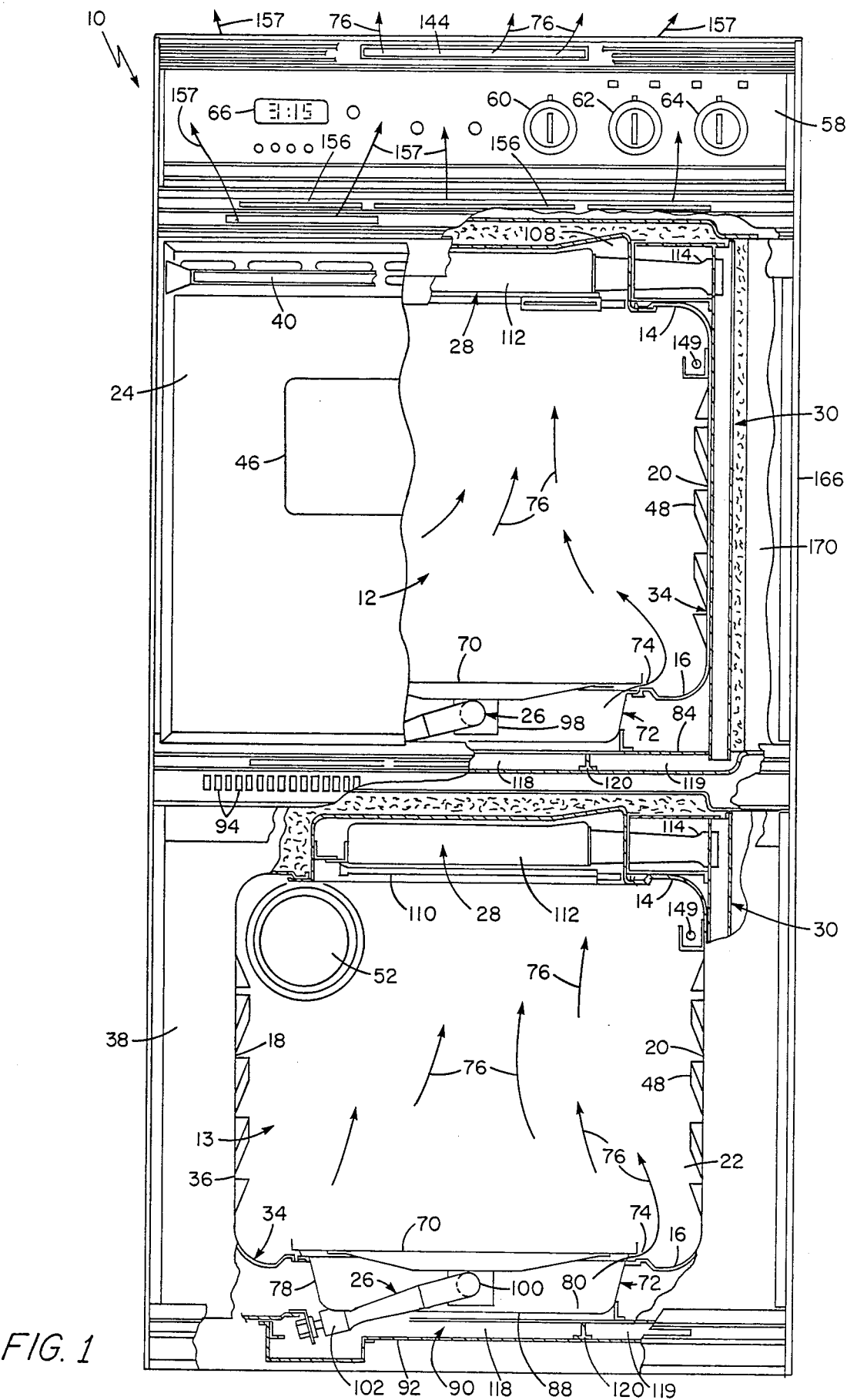
FIG. 1 is a partially broken-away front view of a self-clean gas wall oven having two oven compartments.

Referring to the drawings wherein like characters of reference designate like parts throughout the several views, the present invention defines a built-in double wall oven 10 having a first oven compartment 12 positioned above a second oven compartment 13, both of which comprise a top 14, bottom 16, side walls 18 and 20, a back wall 22 and a door 24. A first burner 26 or 28 is positioned in compartment 12 and a second burner 26 or 28 is positioned in the second oven compartment 13 for providing combustion products 76. A combustion product manifold 132 is positioned above the upper compartment 12 and respective flue pipes 106 and 104 couple the upper and lower oven compartments 12 and 13 to the manifold 132. The manifold 132 has one flue exhaust port 144 located at the top of oven 10. Entrance 141 of flue pipe 106 into manifold 132 is larger than entrance 133 and larger than vertical section 138 so as to avoid putting a back pressure on compartment 12.

Figure 2:
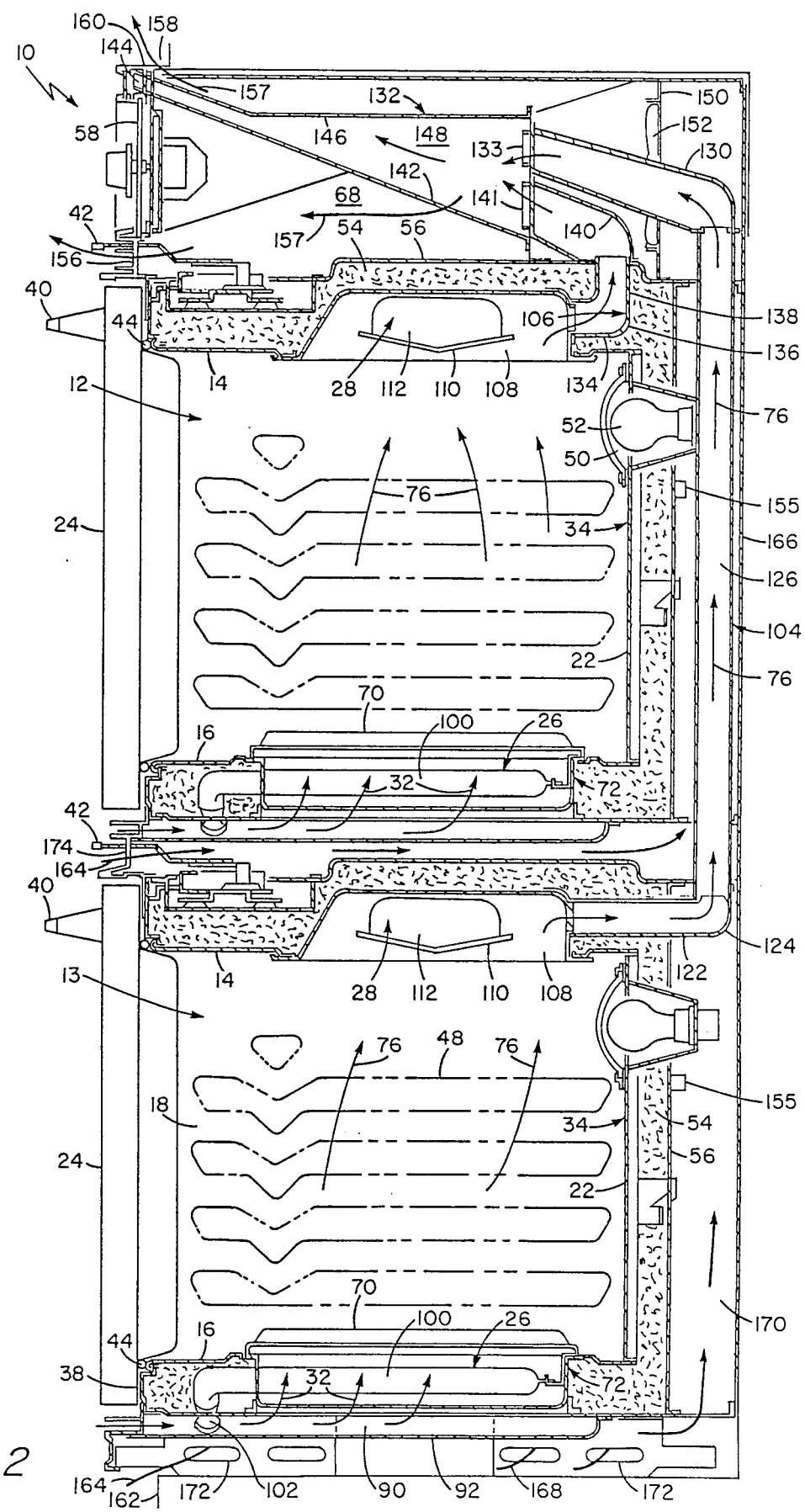
FIG. 2 is a side sectioned view of the oven of FIG. 1.

With reference to FIGS. 1 and 2, there are shown partially broken-away front and side sectioned views of a built-in gas self-cleaning double wall oven 10 using the invention to advantage. In the present description, it is believed unnecessary to show and describe well-known and conventional parts such as gas lines, gas valves and controls, ignitors, control lines, etc. since they do not in themselves constitute any part of the present invention. Double wall oven 10 here includes an upper cooking compartment 12 and a lower cooking compartment 13. These compartments 12 and 13 or cavities are substantially the same, and therefore a generalized description of one compartment will be sufficient for the other. Accordingly, like reference numerals have generally been used for the corresponding parts of both compartments 12 and 13. Each compartment 12 and 13 includes a substantially box-shaped metal liner 34 which defines a top wall 14, a bottom wall 16, a pair of side walls 18 and 20, and a back wall 22. The interior surfaces of liner 34 may be fabricated in conventional manner such as, for example, by applying a layer of porcelain enamel (not shown). The oven or cooking compartments 12 and 13 are accessed through respective openings 36 which are closed by doors 24 which are seated up against face plates 38. Each door 24 is mounted on the front by suitable hinges (not shown) whereby the door is pivotably movable using handle 40 into an open or closed position. As is conventional with pyrolytic self-clean ovens, latches 42 are provided to lock the doors closed, and thermal gaskets 44 seal the compartments 12 and 13 so that the self-cleaning temperatures can be reached.

Doors 24 are preferably filled with insulation and may be provided with a heat resistant transparent window 46 for viewing the oven cooking compartments 12 and 13. Also, air may be circulated through doors 24 to help keep them cool during operation. The side walls 18 and 20 of the cooking compartments 12 and 13 have contoured regions to form side shelves 48 for supporting metal racks (not shown). Also, the back wall 22 of each compartment 12 and 13 may have an aperture 50 for mounting a light 52. The top walls 14, bottom walls 16, side walls 18 and 20, and back walls 22 are surrounded by insulation 54 which is encased on the opposite side by suitable retaining walls 56.

Located above upper cooking compartment 12 is a control panel 58 which includes control knobs 60, 62, and 64 for controlling the operation of both compartments 12 and 13 during such operative modes as bake, broil, and self-clean. Also, control panel 58 may preferably include a clock 66. A plenum 68 located behind control panel 58 houses control components (not shown).

The bottom wall 16 or bottom of each cooking compartment 12 and 13 includes a removable cover 70 which seats over a burner box 72 and has spacings 74 or openings at the lateral sides for permitting combustion products 76 to flow into the respective oven compartments 12 and 13. More specifically, referring to FIG. 4, there is shown a perspective view which includes burner box 72 or combustion cavity which has four sides 78 and a floor 80 with elongated apertures 82. Burner box 72 seats on horizontal metal panel 84 which has a large hole 86 as shown best in FIG. 3. Accordingly, the underside 88 of burner box 72 communicates with combustion air chamber 90 which is formed by horizontal metal panel 84 on the top and enclosure panel 92 on the bottom, sides and back. Enclosure panel 92 may be connected to panel 84 using spot welds 85. Combustion air chamber 90 communicates outside the bottom front of the respective cooking compartments 12 and 13 through slots 94. Accordingly, secondary combustion air 32 for burner box 72 flows through slots 94, combustion air chamber 90, and elongated apertures 82.

Figure 4:
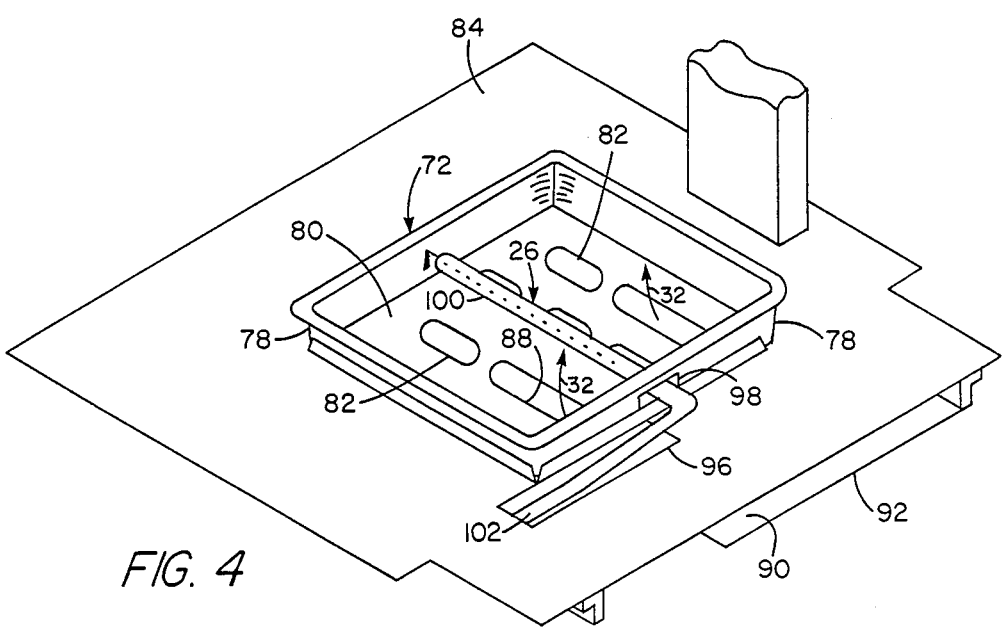
FIG. 4 is the apparatus of FIG. 3 further including a burner box and bake burner.

As shown in FIGS. 1, 2, and 4, bake burner 26 extends from air chamber 90 through aperture 96 in horizontal metal panel 84 into burner box 72 through aperture 98 therein. Bake burner 26 extends a substantial distance from the front to the rear of burner box 72 or burner cavity. Preferably, bake burner 26 is a conventional blue flame type burner which includes a ported burner head 100 and a gas receiving chamber for receiving gaseous fuel from a venturi 102 or the like. As is well known, a gas carrying pipe (not shown) is routed to venturi 102. Primary combustion air travels to venturi 102 and into air chamber 90 where venturi 102 is positioned. A suitable ignitor (not shown) would also be used. The combustion products 76 from bake burner 26 flow through spacings 74 into respective cooking compartments 12 and 13 for heating in the bake and self-clean modes. As an example, bake burner 26 may produce approximately 15,500 Btu per hour. The combustion products 76 from the lower oven compartment 13 exit through flue pipe 104, and the combustion products 76 from the upper oven compartment 12 exit through flue pipe 106.

Figure 3:
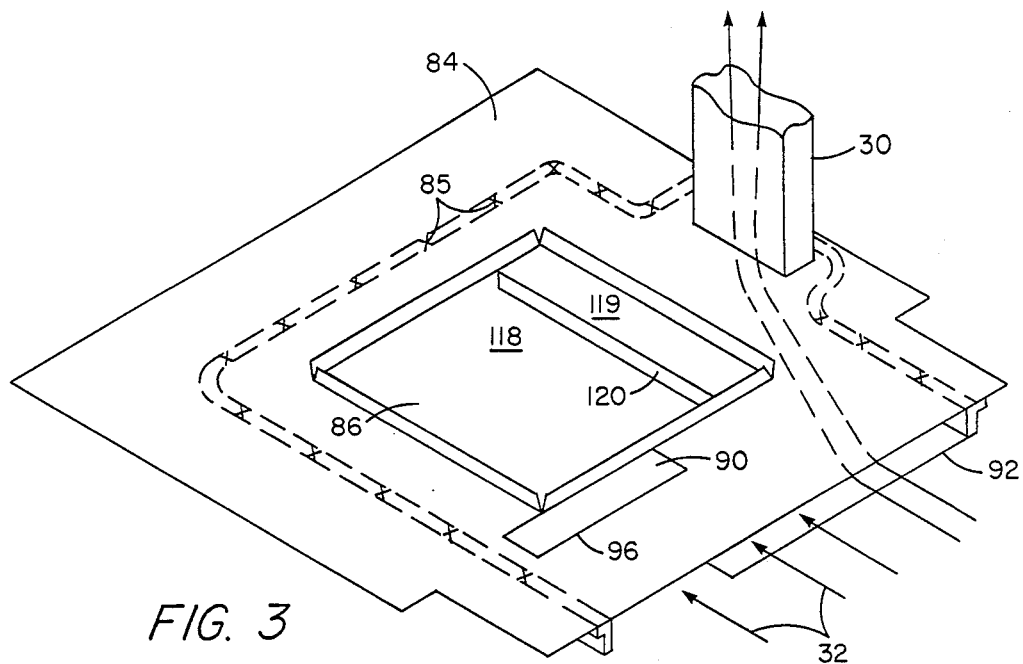
FIG. 3 is a front perspective view of the region underneath the bottom of an oven compartment.

The respective tops 14 of oven compartments 12 and 13 have recessed regions 108 in which broil burners 28 are mounted. Preferably, broil burners 28 are of the type known as radiant burners wherein a broad sheet of flame heats an underscreen 110 to an incandescent temperature which provides the radiant heat. One example of a radiant burner of a type suitable for use in the self-clean oven of the present invention is that disclosed in U.S. Pat. No. 3,122,197. Such radiant burner 28 includes a burner head 112 defining an open-sided cavity and a mixing chamber such as a venturi 114 adapted to receive gas from a pipe (not shown). The mixing chamber of radiant burner 28, for efficient and rapid combustion, is required to receive an ample supply of primary combustion air from duct 30. For example, ten parts of air to one part of gas is considered to be one satisfactory ratio in the case of natural gas. Typically, broil burner 28 may produce approximately 12,000 Btu per hour. Duct 30 or conduit runs vertically along the outside of side wall 20 and communicates with a portion of air chamber 90. As shown best in FIGS. 1 and 3, a front-to-back vertical partition 120 or baffle separates at least a portion of air chamber 90 into left and right sections 118 and 119, respectively. Accordingly, primary combustion air destined for broil burner 28 travels through slots 94 and into right section 119 of combustion air chamber 90. The purpose of baffle or partition 120 is to isolate the combustion air to bake burner 26 from duct 30 and right section 119 so that, when the bake burner 26 is activated and the broil burner 28 is off, combustion products are prevented from recirculating through broil burner 28 back down duct 30 to bake burner 26. If this were permitted to happen, there could be incomplete combustion resulting in wall oven 10 producing excessive CO. Partition 120 may be in a variety of forms such as, for example, an inverted T having its horizontal members connected to the bottom of enclosure panel 92 by spot welds. Here, partition 120 runs less than the entire distance from the back wall 22 to the front because sufficient isolation between combustion air and potentially recirculating combustion products is provided by a shorter span as shown in FIG. 3.

Figure 5:
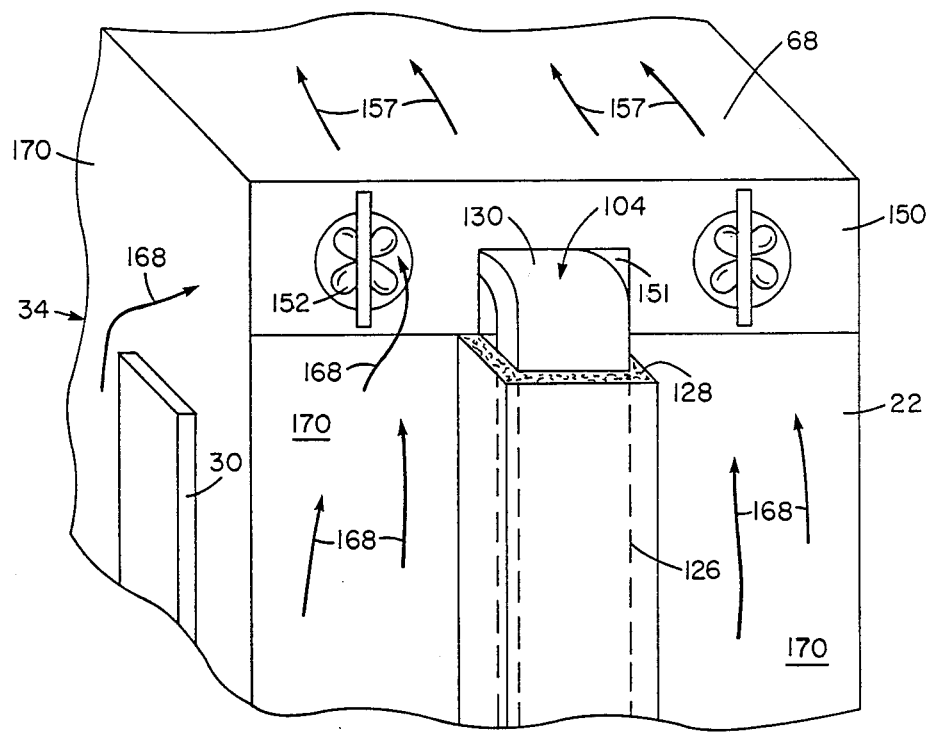
FIG. 5 is a rear perspective view of the oven with the outer casing removed.
Figure 6:
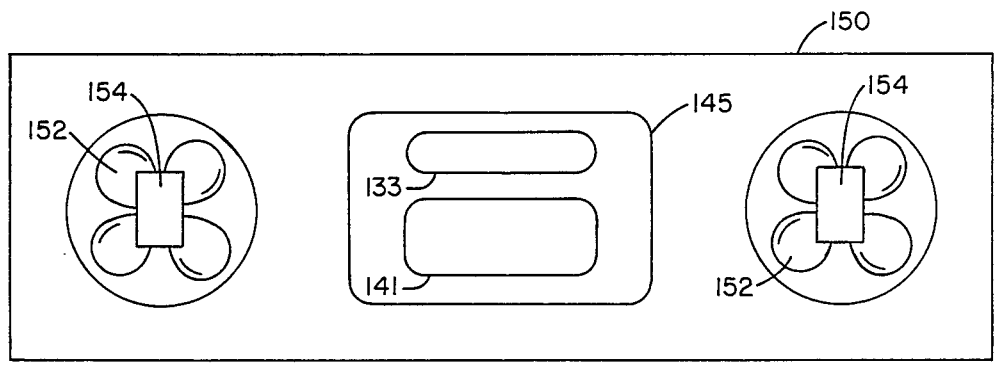
FIG. 6 is a front perspective view of a portion of the plenum behind the control panel.

Whether from bake burner 26 or broil burner 28, the combustion products in lower oven compartment 13 exit through flue pipe 104. After a relatively short horizontal section 122, flue pipe 104 takes a 90° bend 124 and couples to a vertical section 126. Still referring to FIG. 2, and also to FIG. 5 which shows a rear perspective view of oven 10 with the outer casing removed, vertical section 126 of flue pipe 104 extends upwardly along the outside of the back wall 22 of the upper oven compartment 12. Vertical section 126 or vent duct may preferably have cross-sectional dimensions of approximately 4.25×1.25 inches and may preferably be encased with an insulation material 128. At a point above top wall 14 of oven compartment 12, vertical section or duct 126 couples to inclined section 130 which inclines towards the front. Inclined section 130 communicates with flue manifold 132 or flue mixing chamber and the entrance 133 thereto may preferably be approximately 4.25×1.25 inches with rounded corners as shown in FIG. 6.

Whether from bake burner 26 or broil burner 28, the combustion products in upper oven compartment 12 exhaust through flue pipe 106 which, after a very short horizontal section 134, has a right angle bend 136 which couples to a short vertical section 138. Vertical section 138 may preferably have cross-sectional dimensions of 4.25×1 inches and couples to inclined section 140 which is underneath inclined section 130 and has larger cross-sectional dimensions such as, for example, 4.25×2.25 inches than vertical section 138. Inclined section 140 of flue pipe 106 also communicates with flue manifold 132. As shown best in FIG. 6, inclined section 140 couples to flue manifold 132 below inclined section 130 of flue pipe 104. Also, the entrance 141 of inclined section 140 is larger than the entrance 133 of inclined section 130 and may, for example, be approximately 4.25×2 inches with rounded corners.

Figure 7:
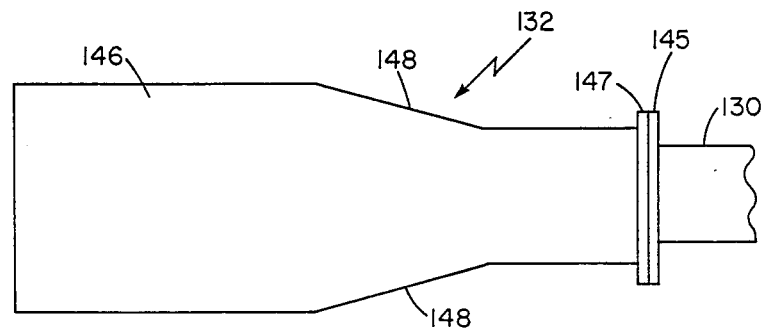
FIG. 7 is a top view of the flue manifold.

Inclined section 130 and inclined section 140 are coupled to common flue mixing chamber or flue manifold 132 because of the limited front area of oven 10 from which combustion products can be exhausted. More specifically, with a built-in wall oven, all sides are encased except for the front. Accordingly, all the combustion air and flue products must be vented through the front. As will be described later, cooling air must also be vented out the front with a self-cleaning oven. And here, with a double oven, the flue or combustion products from the two oven compartments 12 and 13 are combined or mixed so as to reduce the exhaust or vent area on the front. The lower wall 142 of flue manifold 132 inclines upwardly to flue exhaust 144 above control panel 58. Because of space limitations, the upper wall 146 of flue manifold 132 is substantially horizontal. Referring to FIG. 7, a top view of flue manifold 132 is shown. The sides 148 of flue manifold 132 expand laterally so that the cross-section of flue manifold 132 does not become too restrictive as the vertical height decreases. Also, the increased lateral width provides more area for flue exhaust 144 or vent which is restricted in height. As an example, the lateral width of flue manifold 132 may increase from approximately 7 inches at the entrances 133 and 141 of inclined sections 130 and 140 to approximately 9.75 inches at flue exhaust 144. Flanges 145 and 147 couple manifold 132 to flue pipes 104 and 106.

The cross-sectional area of inclined section 140 is significantly larger than the horizontal and vertical sections 134 and 138 of flue pipe 106 so that, when both oven compartments 12 and 13 are in operation, combustion products from inclined section 130 will not put a back pressure on the entrance 141 of flue pipe 106 into flue manifold 132. Rather, the primary restriction on flue pipe 106 is back in the horizontal and vertical sections 134 and 138 of flue pipe 106 instead of at the entrance to flue manifold 132. It has been found that with the described embodiment, flue pipe 106 does not put a back pressure on lower oven compartment 12. More specifically, flue pipe 104 has a much longer vertical section 126 than flue pipe 106 and therefore has better stack action. Accordingly, the velocity of flue or combustion products from oven compartment 13 is greater than from oven compartment 12. To compensate for the lower velocity of combustion products in flue pipe 106, inclined section 140 is made larger than corresponding inclined section 130 so as to avoid putting a back pressure on oven compartment 12.

In response to control knob 60, 62 and 64 on control panel 58, oven compartments 12 and 13 can generally be operated in either a bake, broil, or self-clean mode. In a bake mode, the oven compartment 12 or 13 is raised to a set temperature by bake burner 26 and is maintained at that temperature in response to thermal sensor 149. In the broil mode, broil burner 28 is activated so that screen 110 is heated to an incandescent temperature. The radiant energy from screen 110 is used to broil food such as meat which is positioned on racks therebelow. In the self-clean mode, latch 42 is first closed and then, it may be preferable to activate broil burner 28 for an initial time period such as 45 minutes or an hour. During this time period, a substantial percentage of the soils are vaporized and as the smoke passes over and around broil burner 28, it is further incinerated because broil burner 28 is extremely hot. Next, it may be preferable to deactivate the broil burner 28 and activate the bake burner 26 for the remainder of the self-cleaning cycle. Typically, a self-cleaning cycle may last for two or three hours and, at a temperature in the range from 900°–1100° F., the soils on the walls of the oven will degrade.

Referring to FIG. 6, there is shown a front perspective view of a portion of plenum 68 behind control panel 58. Shown in the center is a view of entrances 133 and 141 from respective flue pipes 104 and 106 into flue manifold 132. Inclined section 130 of flue pipe 104 inserts through an opening 151 in vertical partition 150. As shown in FIG. 6 and also in FIGS. 2 and 5, fans 152 having motors 154 are mounted in partition 150 on both sides of opening 151. Thermal sensors 155 are mounted on the back of respective oven compartments 12 and 13 outside the insulation 54. Although other mounting positions and/or activating temperatures could be used, thermal sensors 155 are here mounted on the top right side and are switched at 150° F. In response to either thermal sensor being switched at 150° F., fans 152 are activated and provide a forwardly directed flow of air 157 from behind partition 150 through plenum 68 and out of vents or exit apertures 156 which are below control panel 58 and exit apertures 158 which are in a horizontal section 160 adjacent to wall 162. This forced flow of air 157, as shown by the arrows, provides cooling of plenum 68 so as to reduce the temperature to which control components (not shown) are subjected. More importantly, the forced air 157 draws in outside ambient air 164 that flows across the outer surfaces of the oven compartments 12 and 13 thereby removing heat that has passed through the insulation. More specifically, oven 10 has an outer casing 166 or jacket that spacedly surrounds the outer walls and/or insulation 54 and thereby creates a chamber 170 surrounding oven compartments 12 and 13.

With respect to oven compartment 13, outside ambient air 164 is drawn in from the bottom front underneath panel 92 and flows back underneath and up air chamber 170 at the rear. Also, as shown in FIGS. 1 and 2, cooling air 168 is drawn laterally through apertures 172 up through chamber 170 along the sides of oven compartments 12 and 13. Further, there is an opening 174 at the front, and cooling outside ambient air 164 is drawn in between the top of oven compartment 13 and the bottom of oven compartment 12. Similarly, with respect to oven compartment 12, cooling air 168 flows up chamber 170 on the sides, and, on the back, up both sides of the vertical section 126 of flue pipe 104. This total flow of cooling air 168 which goes under, up the sides, and up the back of oven 10 through air chamber 170 is drawn by fans 152.

All of the sections of air chamber 170 through which cooling air 168 passes are isolated from the air paths earlier described for primary combustion air, secondary combustion air, and combustion products. Accordingly, the movement of cooling air 168 around the outside of oven 10 so as to keep the outer surfaces at acceptable temperatures does not interfere with the burning characteristics of any of the burners 26 and 28. Not only is the cooling and burning air separated, but an ample supply of both is provided through the relatively limited area on the front of a wall oven, here shown as a double wall oven.

This completes the description of the preferred embodiment. However, those skilled in the art will understand that there are a variety of modifications possible without departing from the spirit and scope of the invention. Accordingly, it is intended that the scope of the invention only be limited by the appended claims.

What is claimed is:

1. A gas self-clean double wall oven, comprising:
a first oven compartment comprising a top, bottom, side and back walls, and a door;
a first burner for providing combustion products to said first oven compartment;
a second oven compartment positioned below said first oven compartment and comprising a top, bottom, side and back walls, and a door;
a second burner for providing combustion products to said second oven compartment;
a first flue pipe for exhausting said combustion products from said first oven;
a second flue pipe for exhausting said combustion products from said second oven compartment; and
a combustion product manifold positioned above said first oven compartment, said manifold comprising a first entrance port for receiving said combustion products from said first flue pipe and a second entrance port for receiving said combustion products from said second flue, said second entrance port being located above said first port, said manifold further comprising means for directing said received combustion products out the top front of said double wall oven.

2. The double wall oven recited in claim 1 wherein said second flue pipe extends up along said back wall of said first oven compartment.

3. The double wall oven recited in claim 2 wherein said first entrance port has a substantially larger cross-sectional area than said second entrance port.

4. The double wall oven recited in claim 1 wherein at least a portion of said first flue pipe has a cross-sectional area substantially smaller than the cross-sectional area of said first entrance port.

5. The double wall oven recited in claim 1 wherein said manifold has an inclined bottom, a substantially horizontal top, and sides that expand laterally from back to front.

6. The double wall oven recited in claim 1 further comprising a cooling air chamber surrounding said first and second oven compartments and means for moving air through said cooling air chamber.

7. The double wall oven recited in claim 6 wherein said moving air means comprises a pair of fans for forcing air forward across the top of said first oven compartment.

8. A gas self-clean double wall oven, comprising:

a first oven compartment comprising a top, bottom, side and back walls, and a door;

means for providing combustion products for heating said first oven to a self-clean temperature;

a second oven compartment positioned below said first oven compartment and comprising a top, bottom, side and back walls, and a door;

means for providing combustion products for heating said second oven compartment to a self-clean temperature;

a combustion product manifold positioned above said first oven, said manifold having an exit port venting outside the front of said double wall oven, and a first entrance port positioned below a second entrance port;

a first flue pipe coupled between said first oven compartment and said first entrance port of said manifold for exhausting said combustion products from said first oven compartment;

a second flue pipe coupled between said second oven compartment and said second entrance port of said manifold for exhausting said combustion products from said second oven compartment, said second flue pipe extending up along said back wall of said first oven compartment;

a cooling air chamber surrounding said first and second oven compartments; and means comprising at least one fan positioned above said first oven compartment for forcing air forwardly and outside said double wall oven and for drawing air through said cooling air chamber.

9. The double wall oven recited in claim 8 wherein said first entrance port is substantially larger than said second entrance port.

10. The double wall oven recited in claim 9 wherein said first entrance port is approximately twice as large as said second entrance port.

11. The double wall oven recited in claim 8 wherein at least a portion of said first flue pipe has a cross-sectional area substantially smaller than the cross-sectional area of said first entrance port into said manifold.

12. The double wall oven recited in claim 8 wherein said manifold has an inclined bottom, a substantially horizontal top, and sides that expand laterally from back to front.

* * * * *